(12) United States Patent
Chen et al.

(10) Patent No.: US 9,177,292 B2
(45) Date of Patent: Nov. 3, 2015

(54) CAUTIOUS AUTO-ENTRY FOR MESSAGING SYSTEMS

(75) Inventors: Li Chen, Cary, NC (US); Yongcheng Li, Cary, NC (US); Lun Xiao, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1933 days.

(21) Appl. No.: 11/458,488

(22) Filed: Jul. 19, 2006

(65) Prior Publication Data

US 2008/0037733 A1   Feb. 14, 2008

(51) Int. Cl.
*G06F 15/173* (2006.01)
*G06Q 10/10* (2012.01)
*H04M 1/64* (2006.01)

(52) U.S. Cl.
CPC .............. *G06Q 10/107* (2013.01); *H04M 1/64* (2013.01)

(58) Field of Classification Search
USPC ................................................. 709/202–206
See application file for complete search history.

(56) References Cited

U.S. PATENT DOCUMENTS

| | | | |
|---|---|---|---|
| 6,208,339 B1 | 3/2001 | Atlas et al. | |
| 6,377,965 B1 | 4/2002 | Hachamovitch et al. | |
| 6,829,607 B1 | 12/2004 | Tafoya et al. | |
| 6,952,805 B1 * | 10/2005 | Tafoya et al. | 715/739 |
| 6,961,414 B2 | 11/2005 | Inon et al. | |
| 7,685,144 B1 * | 3/2010 | Katragadda | 707/999.101 |
| 7,908,287 B1 * | 3/2011 | Katragadda | 707/767 |
| 2005/0108344 A1 | 5/2005 | Tafoya et al. | |
| 2005/0198144 A1 | 9/2005 | Kraenzel et al. | |
| 2006/0224553 A1 * | 10/2006 | Chtcherbatchenko et al. | ... 707/1 |
| 2006/0242243 A1 * | 10/2006 | Matsumoto | 709/206 |
| 2008/0065617 A1 * | 3/2008 | Burke et al. | 707/5 |
| 2010/0199177 A1 * | 8/2010 | Kraenzel et al. | |
| 2012/0159317 A1 * | 6/2012 | Di Cocco et al. | 715/261 |

* cited by examiner

*Primary Examiner* — Tauqir Hussain
(74) *Attorney, Agent, or Firm* — Steven M. Greenberg, Esq.; CRGO Law

(57) ABSTRACT

Embodiments of the present invention address deficiencies of the art in respect to auto-entry of addresses in an electronic message and provide a novel and non-obvious method, system and computer program product for cautious auto-entry for messaging systems. In one embodiment of the invention, a cautious auto-completion method can be provided. The method include auto-completing a messaging address provided in a messaging client; computing a similar name set (SNS) value for the auto-completed messaging address; and, posting a warning if the SNS value exceeds an SNS threshold. As used herein, an SNS includes a list of similar messaging addresses having similarities likely to result in an unintended auto-completed messaging address in a messaging system.

18 Claims, 2 Drawing Sheets

CAUTIOUS AUTO-ENTRY FOR MESSAGING SYSTEMS

BACKGROUND OF THE INVENTION

1. Field of the Invention

The present invention relates to the field of electronic messaging and more particularly to the auto-complete feature for message addresses in an electronic messaging system.

2. Description of the Related Art

Electronic messaging represents the single most useful task accomplished over wide-scale computer communications networks. Some argue that in the absence of electronic messaging, the Internet would have amounted to little more than a science experiment. Today, electronic messaging seems to have replaced the ubiquitous telephone and fax machine for the most routine of interpersonal communications. As such, a variety of electronic messaging systems have arisen which range from real-time instant messaging systems and wireless text pagers to asynchronous electronic mail systems.

Electronic mail, a form of electronic messaging referred to in the art as e-mail, has proven to be the most widely used computing application globally. Though e-mail has been a commercial staple for several decades, due to the explosive popularity and global connectivity of the Internet, e-mail has become the preferred mode of communications, regardless of the geographic separation of communicating parties. Today, more e-mails are processed in a single hour than phone calls. Clearly, e-mail as a mode of communications has been postured to replace all other modes of communications, save for voice telephony.

In the conventional e-mail client, an end user can create an e-mail with a body of text and the end user optionally can attach one or more files to be transmitted along with the message in the body of text. Before transmitting the e-mail, the end user further can address the e-mail by providing one or more e-mail addresses and designating those addresses as primary recipients (To:) of the e-mail, secondary recipients (CC:) of the e-mail, or stealth recipients (BCC:) of the e-mail. For the casual e-mail user, remembering e-mail addresses can be of no consequence. For the dedicated e-mail user, however, remembering a vast number of different e-mail addresses can present a challenge.

Many successful commercial implementations of e-mail clients provide for an auto-completion feature. An auto-completion feature generally refers to the automated recollection by the e-mail client (or the e-mail server) of past used or previously stored e-mail addresses based upon the provision of just one or more characters of the desired e-mail address. In this way, the end user need only key a few keystrokes followed by a mouse click in order to accept the proposed e-mail address. The convenience of auto-completion is not without consequence, however.

Specifically, the speed at which an end user accepts a proposed e-mail address as part of the auto-completion operation often can result in the end user accepting the wrong e-mail address. As a result, in many circumstances, the end user can transmit an e-mail message to an un-intended recipient. In the worst case scenario, the content of the e-mail message can be private and confidential giving rise to an unintended breach of privacy.

BRIEF SUMMARY OF THE INVENTION

Embodiments of the present invention address deficiencies of the art in respect to auto-entry of addresses in an electronic message and provide a novel and non-obvious method, system and computer program product for cautious auto-entry for messaging systems. In one embodiment of the invention, a cautious auto-completion method can be provided. The method include auto-completing a messaging address provided in a messaging client; computing a similar name set (SNS) value for the auto-completed messaging address; and, posting a warning if the SNS value exceeds an SNS threshold. As used herein, an SNS includes a list of two or more similar messaging addresses having similarities likely to result in an unintended auto-completed messaging address in a messaging system.

In one aspect of the embodiment, computing an SNS value for the auto-completed messaging address can include computing an SNS value for the auto-completed messaging address according to a similarity of words in the auto-completed messaging address to words in another previously auto-completed messaging address. In another aspect of the invention, computing an SNS value for the auto-completed messaging address can include computing an SNS value for the auto-completed messaging address according to a prior history by an end user of sending messages to the auto-completed messaging address. In yet another aspect of the invention, computing an SNS value for the auto-completed messaging address can include manually establishing an SNS value for the auto-completed messaging address responsive to identifying the auto-completed messaging address as an unintended messaging address.

In another embodiment of the invention, a cautious auto-completion configured messaging data processing system can be provided. The system can include a messaging client; an addressee master list communicatively linked to the messaging client; and cautious auto-completion logic coupled to the messaging client and the addressee master list. The cautious auto-completion logic can include program code enabled to generate an auto-completed messaging address and post a warning when the auto-completed messaging address has an SNS value that exceeds a prescribed SNS threshold. The system further can include SNS computation logic including program code enabled to produce SNS values for auto-completed messaging addresses according to heuristics.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the cautious auto-entry of message addresses. In accordance with an embodiment of the present invention, auto-completed message addresses can be evaluated as compared to other previously applied message addresses in order to compute an SNS value. The SNS value can indicate the likelihood that the auto-completed message address will be confused with another previously applied message address during an auto-complete operation. If the SNS value exceeds an SNS threshold value, the end user can be warned of the possibility that the auto-completion has produced an unintended message address.

Figure 1:
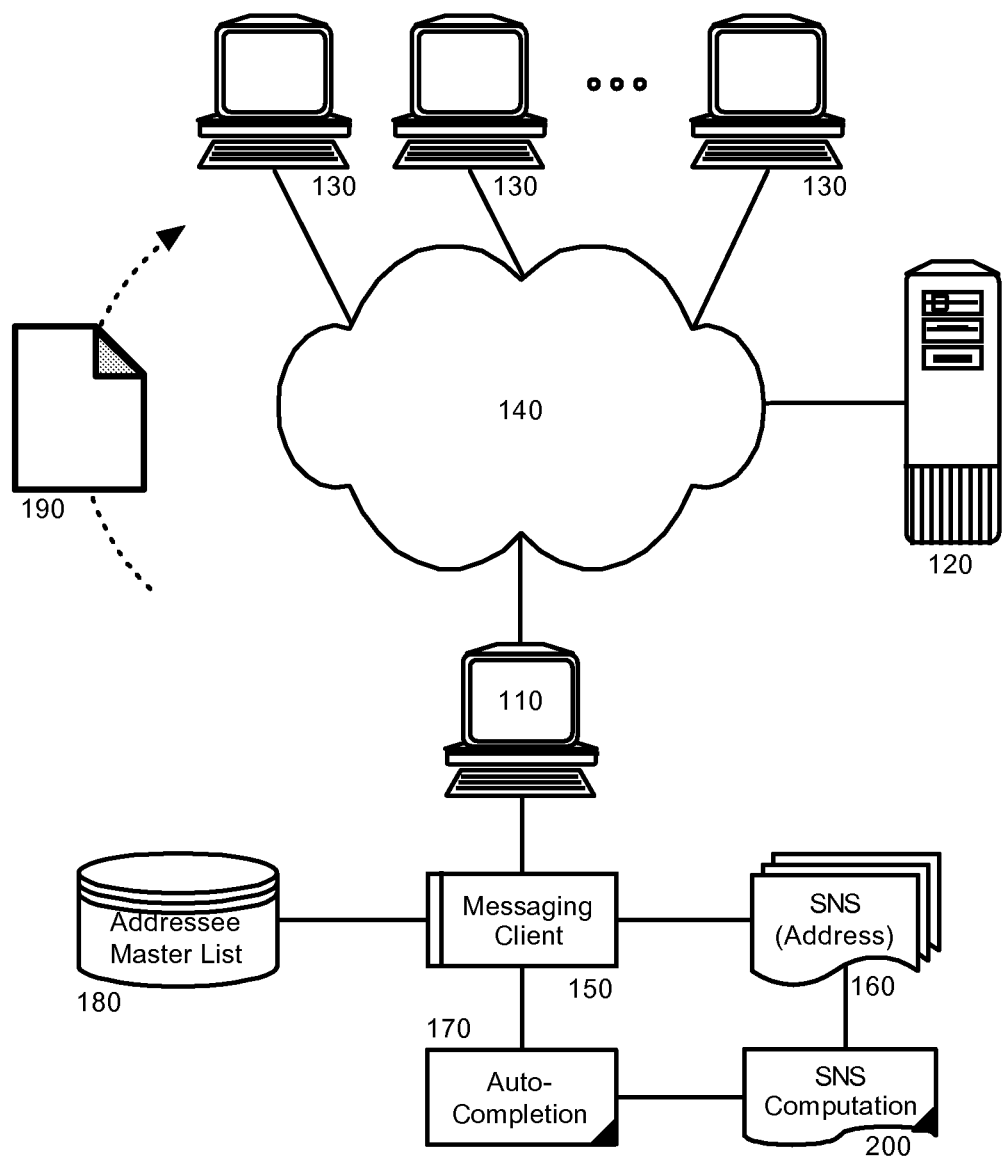
FIG. 1 is a schematic illustration of a messaging system configured for cautious auto-entry of message addresses.

In more particular illustration, FIG. 1 is a schematic illustration of a messaging system configured for cautious auto-entry of message addresses. The system can include a messaging server 120 coupled to one or more messaging clients supported by client computing platforms 110, 130 over a computer communications network 140. The messaging server 120 can be configured to support the exchange of messages between the messaging clients in the client computing platforms 110, 130 according to one or more messaging protocols. Exemplary messaging protocols include electronic mail protocols and instant messaging protocols.

At least one of the client computing platforms 110 can include a messaging client 150 coupled to cautious auto-completion logic 170. The messaging client 150 can provide a user interface through which an end user can compose and transmit an electronic message 190 to a designated recipient or to multiple designated recipients. The designated recipients can be specified according to messaging address such as an electronic mail address or screen name, to name only two possible addressing schemes. The cautious auto-completion logic 170 can include program code enabled to facilitate the specification of a messaging address by auto-completing the messaging address based upon a set of leading characters in the address that can include as few as one character and the content of an addressee master list 180 of previously specified messaging addresses.

Notably, the cautious auto-completion logic 170 can be coupled to SNS computation logic 200 and one or more SNSs 160. The SNS computation logic 200 can include program code enabled to produce each of the SNSs 160 based upon both direct specification by the end user and heuristics. In the former circumstance, an end user can specify when an auto-completed address differs from an intended address so as to form a SNS. In the latter circumstance, each of the SNSs 160 can include a set of names for use in one or more messaging addresses that have corresponding SNS values indicating a likelihood that an associated name will produce a messaging address likely to be confused with another messaging address.

In operation, the auto-completion logic 170 can provide an auto-completed messaging address for a provided character or characters in a messaging address for a composed message. The auto-completed messaging address can be used to query the SNSs 160 to identify a likelihood that the auto-completed messaging address was not an intended messaging address. To do so, the auto-completion logic 170 can compute an SNS value for the auto-completed messaging address and can determine whether the SNS value exceeds and acceptable threshold referred to as an SNS threshold. If so, a warning can be provided to the end user in order to goad the end user into confirming the desirability of the auto-completed message address.

Figure 2:
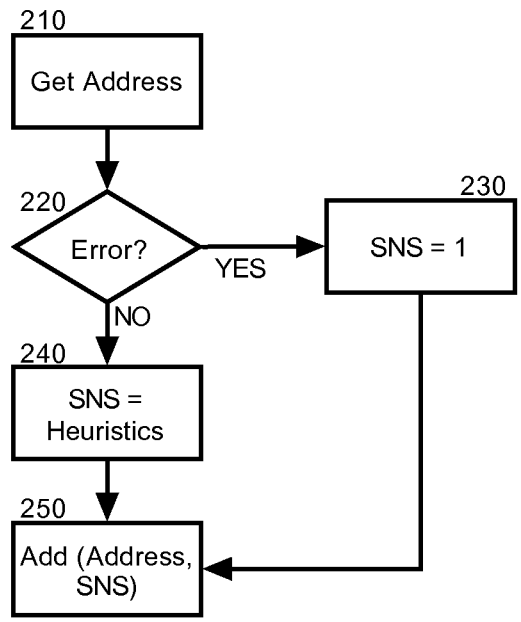
FIG. 2 is a flow chart illustrating a process for generating an SNS for cautious auto-entry of message addresses; and, FIG. 3 is a flow chart illustrating a process for performing cautious auto-entry for message addresses based upon entries in an SNS.

In further illustration of the operation of the program code of the SNS computation logic, FIG. 2 is a flow chart illustrating a process for generating an SNS for cautious auto-entry of message addresses. Beginning in block 210, an auto-completed messaging address can be received for processing. In decision block 220, it can be determined whether the auto-completed messaging address had been selected due to an end user identifying the auto-completed messaging address as having been improperly provided during auto-completion. If so, an SNS value for the auto-completed messaging address can be set to unity as the auto-completed messaging address will have demonstrated an actual instance of confusion. Otherwise, the process can continue through block 240.

In block 240, the SNS value for the auto-completed messaging address can be computed based upon heuristics and stored in association with the auto-completed messaging address in block 250. The heuristics can vary according to end user and can include a number of strategies including similarity of the auto-completed messaging address to other messaging addresses previously provided, or the historical usage of the auto-completed messaging address on an end-user by end-user basis, to name only two such strategies. In either case, end-users can select a strategy for use during auto-completion.

For instance, in one strategy, the number of words in the auto-completed messaging address that are identical to the words in other messaging addresses can be expressed as a proportion of the total number of words in the auto-completed messaging address. In this heuristic strategy, the SNS value can be expressed as:

$$SNSval(addr1,addr2)=((common\ words)*(1-b)/(min(num\ words(addr1,addr2))*a$$

where $0<a<1$; $b=0$ if words are in the same order; and $0<b<1$ otherwise

In another heuristic strategy, the historical behavior of the end user can be used to predict the probability of future error. In this heuristic strategy, the number of electronic messages transmitted to the auto-completed messaging address can be compared to the number of electronic messages sent overall by the end user in order to identify a frequency of transmission of electronic messages to the auto-completed messaging address. The higher the frequency, the more likely it is that the auto-completed messaging address refers to the intended message recipient. This heuristic strategy can be expressed as:

$$SNS\ value(addr1)=1-((num\ messages\ to\ addr1)/(total\ messages))$$

For the special case where no messages have ever been sent to the auto-completed messaging address, the SNS value can be established as 0.0. Likewise, if the end user has not sent any messages to any recipients in an SNS, the SNS value can be established as 0.5.

During auto-completion, the selected hierarchical strategy can be applied and an SNS threshold can be selected according to user preference, default preference, or administrator configuration. Messaging addresses provided by the end user can be auto-completed and, depending upon an SNS value assigned to the auto-completed messaging address, a warning can be displayed to the end user. The warning can be passive in nature and can include a mere change in display characteristics in an element of the user interface for the messaging client, such as a font change, color change or even an audible notification. By comparison, the warning can be active in nature and can include a pop-up dialog box and the like.

Figure 3:
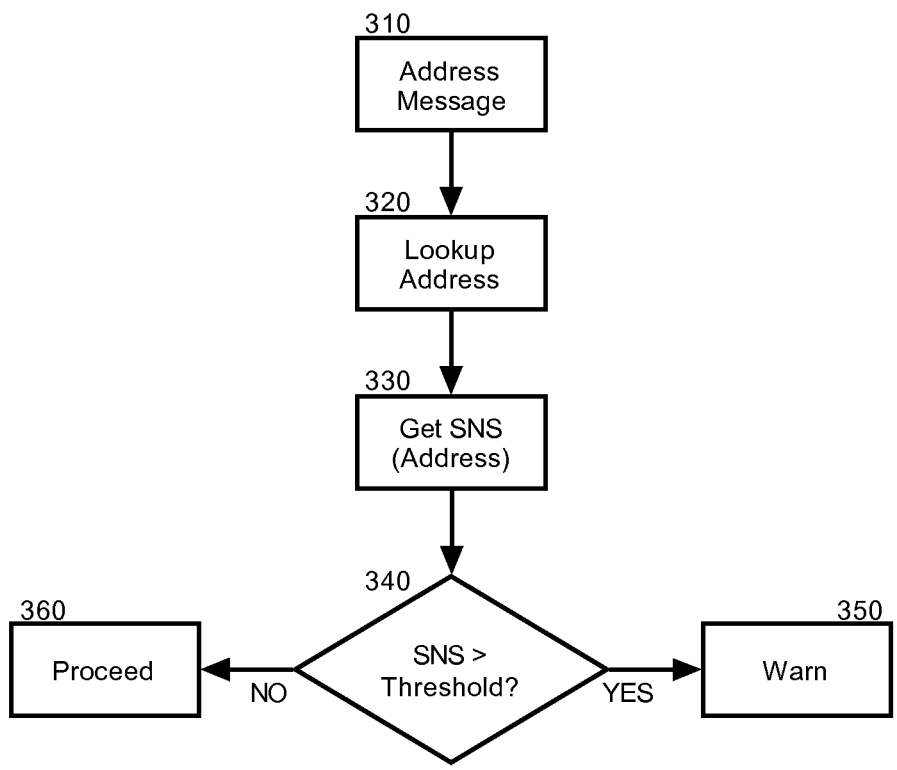

In more particular illustration, FIG. 3 is a flow chart illustrating a process for performing cautious auto-entry for message addresses based upon entries in an SNS. Beginning in block 310, a message can be addressed one character at a time. As the end-user provides characters, auto-completion can provide a proposed messaging address in block 320 and an SNS value can be retrieved (or computed dynamically) for the proposed messaging address in block 330. In decision block 340, if the SNS value exceeds the SNS threshold, in block 350 the warning can be issued. Otherwise, in block 360 the auto-completion operation can be accepted.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A cautious auto-completion method comprising:
auto-completing a messaging address provided in a messaging client;
computing a similar name set (SNS) value for the auto-completed messaging address according to a similarity of words between words in the auto-completed messaging address and words in another previously auto-completed messaging address; and,
posting a warning upon determining that the SNS value exceeds an SNS threshold.

2. The method of claim 1, wherein computing the SNS value further comprises computing the SNS value according to a prior history by an end user of sending messages to the auto-completed messaging address.

3. The method of claim 1, wherein
computing the SNS value further comprises manually establishing the SNS value responsive to identifying the auto-completed messaging address as an unintended messaging address.

4. The method of claim 1, wherein computing the SNS value further comprises computing the SNS value according to the equation $$SNSval(addr1,addr2)=((\text{common words})*(1-b))/(\min(\text{num words}(addr1,addr2))*a$$

where $0<a<1$; $b=0$ if words are in same order; and $0<b<1$ otherwise.

5. The method of claim 2, wherein
the SNS value is computed according to the equation $$SNS\ value(addr1)=1-((\text{num messages to addr1})/(\text{total messages})).$$

6. The method of claim 1, wherein
the warning is a passive warning.

7. The method of claim 1, wherein
the warning is an active warning.

8. A cautious auto-completion configured messaging data processing system comprising:
a messaging client executing in a memory of a computer;
an addressee master list communicatively linked to the messaging client; and,
cautious auto-completion logic executing on a processor of the computer and coupled to the messaging client and the addressee master list, the cautious auto-completion logic comprising program code enabled to
generate an auto-completed messaging address,
compute a similar name set (SNS) value for the auto-completed messaging address according to a similarity of words between words in the auto-completed messaging address and words in another previously auto-completed messaging address, and
post a warning when the SNS value exceeds a prescribed SNS threshold.

9. The system of claim 8, further comprising;
SNS computation logic executing on the processor of the computer and comprising program code enabled to produce similar name sets according to heuristics.

10. The system of claim 9, wherein
the heuristics comprises a similarity of words between words in the auto-completed messaging address and words in the another previously auto-completed messaging address.

11. The system of claim 9, wherein
the heuristics further comprises a prior history by an end user of sending messages to the auto-completed messaging address.

12. A computer program product comprising a non-transitory computer usable storage medium having stored therein computer usable program code for cautious auto-completion, the computer usable program code which for when executed by a computer hardware device, causes the computer hardware device to perform
auto-completing a messaging address provided in a messaging client;
computing a similar name set (SNS) value for the auto-completed messaging address according to a similarity of words between words in the auto-completed messaging address and words in another previously auto-completed messaging address; and posting a warning upon determining that the SNS value exceeds an SNS threshold.

13. The computer program product of claim 12, wherein computing the SNS value further comprising computing the SNS value according to a prior history by an end user of sending messages to the auto-completed messaging address.

14. The computer program product of claim 12, wherein computing the SNS value further comprises manually establishing the SNS value responsive to identifying the auto-completed messaging address as an unintended messaging address.

15. The computer program product of claim 12, wherein computing the SNS value further comprises computing the SNS value according to the equation $$SNSval(addr1, addr2) = ((\text{common words}) * (1-b) / (\min(\text{num words}(addr1, addr2)) * a$$

where $0 < a < 1$; $b = 0$ if words are in same order; and $0 < b < 1$ otherwise.

16. The computer program product of claim 13, wherein the SNS value is computed according to the equation $$\text{SNS value}(addr1) = 1 - ((\text{num messages to addr1}) / (\text{total messages})).$$

17. The computer program product of claim 12, wherein the warning is a passive warning.

18. The computer program product of claim 12, wherein the warning is an active warning.

* * * * *